SERVO-MECHANISM FUNCTION GENERATOR UTILIZING AN ERROR VOLTAGE

Filed Sept. 12, 1950

4 Sheets-Sheet 1

Inventors:
ROLF EDMUND SPENCER
GEOFFREY HUSON STEPHENSON
By Ralph E. Atherton
Attorney July 14, 1959 R. E. SPENCER ET AL 2,894,685

SERVO-MECHANISM FUNCTION GENERATOR UTILIZING AN ERROR VOLTAGE

Filed Sept. 12, 1950 4 Sheets-Sheet 2

Inventors:
ROLF EDMUND SPENCER
GEOFFREY HUSON STEPHENSON
By Ralph E. Atherton
Attorney Inventors:
ROLF EDMUND SPENCER
GEOFFREY HUSON STEPHENSON
By Ralph E. Atherton
Attorney

SERVO-MECHANISM FUNCTION GENERATOR UTILIZING AN ERROR VOLTAGE

Filed Sept. 12, 1950 4 Sheets-Sheet 4

Inventors
R. E. Spencer
G. H. Stevenson

United States Patent Office 2,894,685

Patented July 14, 1959

2,894,685

SERVO-MECHANISM FUNCTION GENERATOR UTILIZING AN ERROR VOLTAGE

Rolf Edmund Spencer and Geoffrey Huson Stephenson, London, England, assignors to Electric & Musical Industries Limited, Hayes, Middlesex, England, a British company Application September 12, 1950, Serial No. 185,664

Claims priority, application Great Britain September 12, 1949

9 Claims. (Cl. 235—150)

Figure 1:
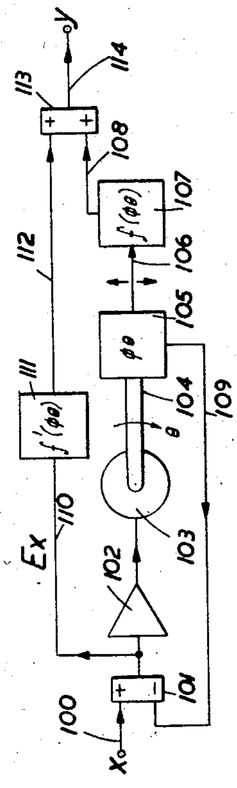

This invention relates to apparatus employing servo-mechanism, and especially but not exclusively to computing apparatus.

In our patent application Ser. No. 110,404, filed August 15, 1949, now forfeited, there is described, with reference to Figure 2, a form of computing apparatus which is capable of evaluating a function of an independent variable, referred to as $f(x)$, at successive particular values of the independent variable $x$. The value of $x$ at any instant is represented by a displacement, namely the position of the contact brush 32, carried in the example described on a rotary arm. However, it is frequently desirable to feed the instantaneous value of the variable to the computer in the form of an electrical magnitude, usually a voltage, and to convert the electrical magnitude to the displacement by means of servo-mechanism which drives the shaft on which the aforesaid rotary arm is mounted. In this case it is convenient to denote the value of the electrical magnitude by $x$ and the angular displacement of the shaft and hence of the brush driven by the servo-mechanism by $\theta$ and the output obtained from the apparatus is then representative of $f(\theta)$ instead of $f(x)$. If the servo-mechanism is perfect, then the value of the independent variable as represented by the magnitude $\theta$ will be equal to the value as represented by the magnitude $x$ and the output of the apparatus, $f(\theta)$ will accurately represent $f(x)$. However, the equality between $\theta$ and $x$ will be maintainable in practice only with difficulty, due to the practical limitations of servo-mechanisms. For instance, the servo-mechanism may be provided with a negative feedback path for feeding from its output to its input a voltage representative of $\theta$ in such phase as to afford negative feedback, the mechanism then operating until the difference between $x$ and $\theta$ is zero. Even in this case, the achievement of a reasonably accurate equality between $x$ and $\theta$ is dependent on the use of a high gain amplifier to amplify the resultant input signal to the servo-mechanism and, due to the time constant of the mechanical parts of the mechanism, a siginificant time is liable to elapse before the mechanism becomes stabilised at the correct position. This in turn may give rise to serious difficulty if the computing apparatus forms part of another servo-loop as may well be the case.

Similar difficulties may arise in other forms of apparatus employing servo-mechanism and the object of the present invention is to reduce the difficulties aforesaid.

According to the present invention there is provided apparatus employing a servo-mechanism for deriving an output which is a function of the input signal to the apparatus comprising a servo-motor, means responsive to the instantaneous displacement effected by the servo-motor for producing said output, means for comparing with the input signal a signal dependent upon the instantaneous displacement effected by the servo-motor to derive an error signal, said servo-motor being responsive to said error signal to produce a displacement in a sense tending to annul said error signal, and means for feeding to the output of said apparatus, by a path circumventing the servo-motor, a correcting signal dependent upon said error signal, whereby the corrected output at any instant is more nearly equal than would otherwise be the case to the desired function of the input signal at the same instant.

In the following specification and the claims, the accent as for example in $f_2'(\theta)$ is used to denote differentiation with respect to the argument of the function, i.e. $\theta$ in the example given. In addition the index $o$, suffixed to a function, as for example in $f_1(\theta)_o$, is intended to denote the instantaneous value of the function.

Figure 2:
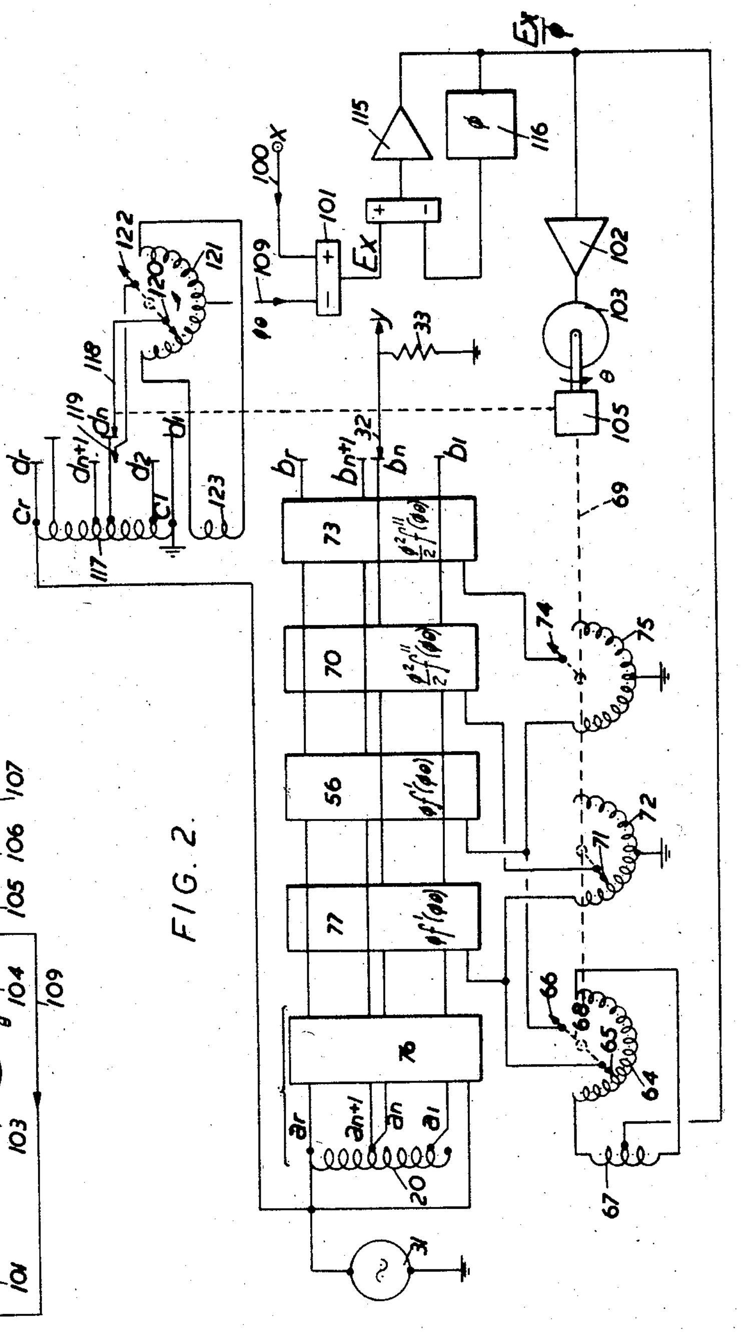
Figures 3, 4:
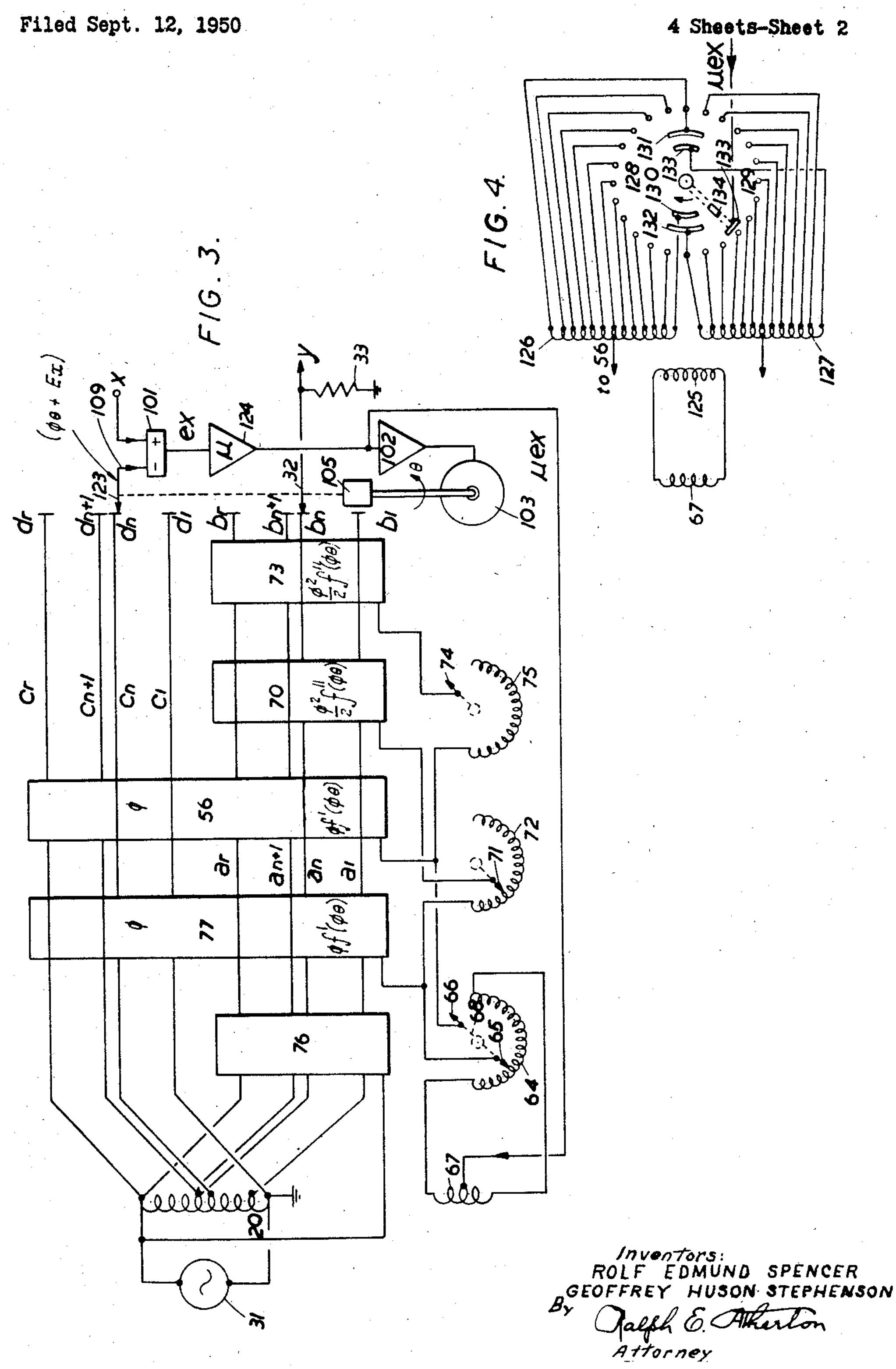
Figure 5:
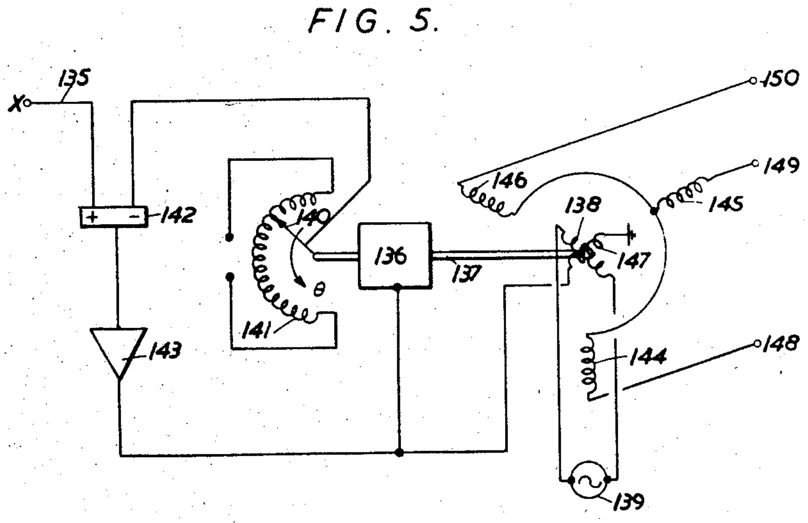
Figure 6:
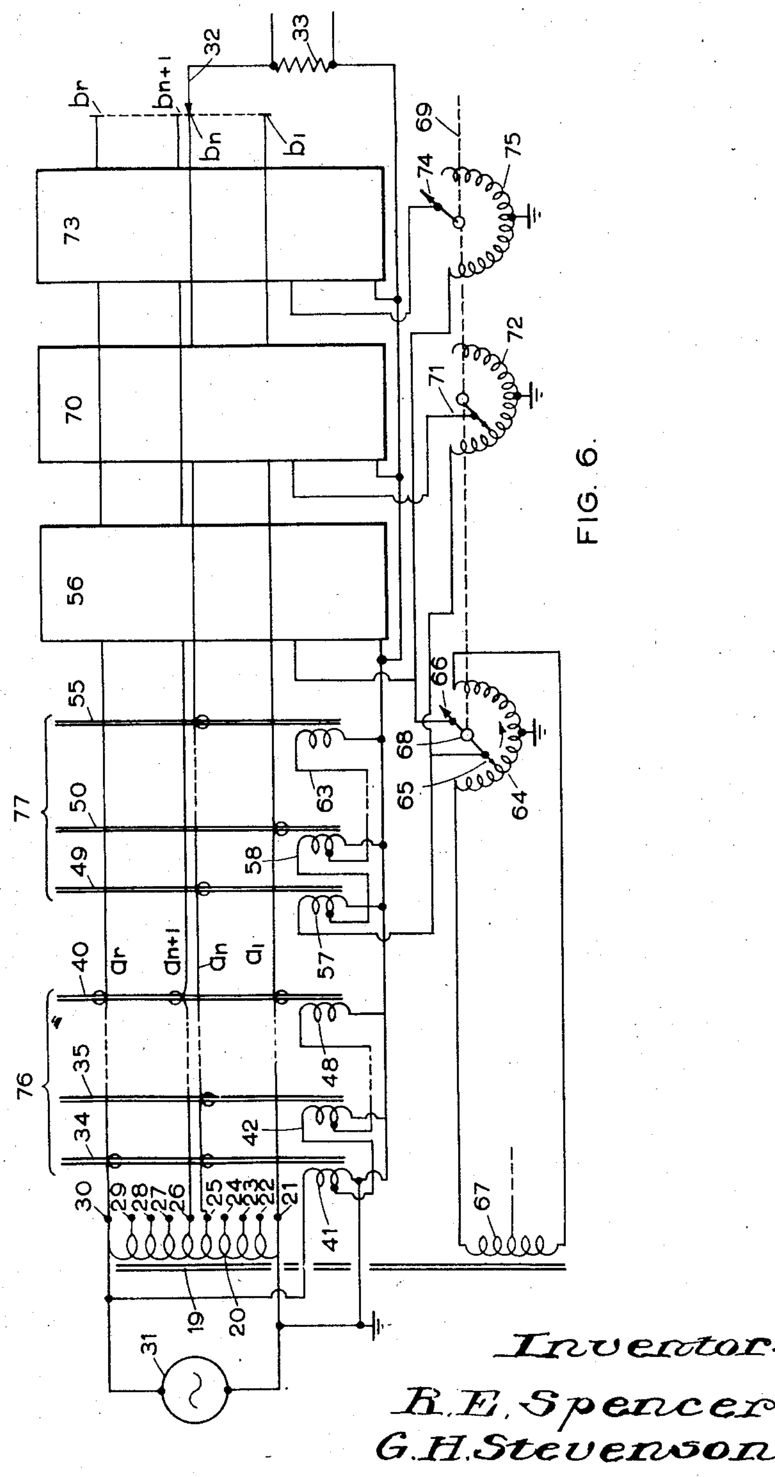

In order that the said invention may be clearly understood and readily carried into effect, the same will now be more fully described with reference to the accompanying drawings, in which:

Figure 1 is a block diagram illustrating the principles of the present invention, Figure 2 illustrates diagrammatically and partly in block form an application of the present invention in the form represented by Figure 1 to computing apparatus of the kind described with reference to Figure 2 of the aforesaid patent application, Figure 3 illustrates a modification of the apparatus illustrated in Figure 2, Figure 4 illustrates a modification of part of Figure 3, Figure 5 illustrates another application of the invention for transmitting an indication of position to a distance, and Figure 6 illustrates in more detail part of Figure 1.

Referring to Figure 1, it will be assumed that the apparatus therein illustrated is intended to evaluate an arbitrary function $f(x)$, denoted for convenience as $y$, for different instantaneous values of the independent variable $x$. The instantaneous value of the independent variable $x$ is fed as a voltage in positive sense by means of a conductor 100 to a device 101 and thence to an amplifier 102. Any conventional input circuit of an amplifier which operates with feedback may constitute the device 101, the plus and minus signs indicating that the feedback is negative so that the voltage input to the amplifier 102 is the difference, herein denoted by E$x$, between the voltage $x$ and the feedback voltage, derivation of the feedback voltage being subsequently referred to. The output of the amplifier drives a servo-motor 103 and causes the shaft 104 thereof to assume at any instant an angular position $\theta$ determined by the voltage $x$. Displacement of the shaft 104 is transmitted by transmission means 105 into displacement of a selector member 106. Any conventional mechanical transmission means may constitute the means 105 and the showing of such means is intended merely to indicate that the selector member 106 may have a different rate of displacement from the shaft 104, though driven thereby. The selector member 106 is associated with a function evaluating device 107 a suitable form of which is illustrated in Figure 2 and which is adapted to feed to a conductor 108 at any instant a voltage representative of the value of a function $f_2(\theta)$, at the particular value of $\theta$ represented by the instantaneous position of the selector member 106. The output derived from the apparatus is a function of the displacement of the selector member 106 which displacement is itself a function of $\theta$. In the general case, therefore, the displacement of the selector member 106 can be represented as $f_1(\theta)$ and the output can be represented as $f_2(\theta)$. In many cases $f_1(\theta)$ will merely be $\theta$, but in the present case will be assumed to be $\phi\theta$, a linear function of $\theta$, where $\phi$ is the velocity ratio of the transmission means 105, that is the ratio of the rate of displacement of the selector 106 to the rate of displacement of the shaft 104. It is therefore convenient to denote $f_2(\theta)$ as $f(\phi\theta)$. The transmission means 105 as illustrated in detail in Figure 2 is arranged to set up a voltage representative of the instantaneous value of $\phi\theta$ i.e. $(\phi\theta)_0$ and this voltage is fed by a negative feedback path 109 to the device 101 so that it constitutes the feedback voltage to the input circuit 101 of the amplifier 102. It will be appreciated that the voltage representative of $\phi\theta$ constitutes a position feedback signal such as used in conventional servo systems. The operation of the servo-motor 103 therefore tends to reduce to zero the difference $Ex$ between the $x_0$ and $(\phi\theta)_0$ and if no difference exists at a given instant the output of the device 107, namely $f(\phi\theta)_0$ will be accurately representative of the desired value of $f(x)$ at that instant, but in general $Ex$ will not be zero so that $f(\phi\theta)_0$ cannot be taken as representative of $f(x)_0$ without liability of significant error. To compensate for such error, the voltage $Ex$ is fed by a conductor 110 to a multiplying device 111 wherein $Ex$ is multiplied by the instantaneous value of the first derivative of $f(\phi\theta)$, denoted by $f'(\phi\theta)_0$. A suitable form of multiplying device 105 is illustrated in Figure 2 and, as also illustrated in this figure, the quantity $f'(\phi\theta)_0$ can sometimes be derived from the function evaluating device 107. For this reason, as appears in Figure 2, parts of the devices 101 and 107 may be common to both devices. The product $Exf'(\phi\theta)_0$ is then fed by a conductor 112 to a device 113 in which it is added to the voltage representative of $f(\phi\theta)_0$ in the conductor 108. The sum obtained from the device 113 is the output $y$ of the apparatus and can be obtained from a conductor 114. It will be appreciated from the foregoing that $y$ is equal to $f(\phi\theta)_0+Exf'(\phi\theta)_0$. Moreover $\phi\theta_0$ is equal to $x_0-Ex$, therefore $$y=f(x_0-Ex)+Exf'(x_0-Ex)$$

Provided that $Ex$ is not too large and that $f''(\phi\theta)$, the second derivative of $\phi\theta$, is small compared with $f'(\phi\theta)$, as will normally be the case, the right hand side of the above equality may, without significant error, be taken as equal to $f(x)_0$. Therefore the output $y$ at any instant is an accurate representation of the $f(x)$, the same function of $x$ as $f(\phi\theta)$ is of $\phi\theta$, for the instantaneous value of $x$, even if $\phi\theta$ does not equal $x$, provided it is near to $x$. The dynamic and static errors of the servo-mechanism do not therefore affect the output obtained from the apparatus and in addition the time constant of the apparatus is no longer determined by the time constant of the servo-mechanism and can therefore be made very much shorter than would otherwise be the case.

In the application of the invention illustrated in Figure 2 the voltage $y$ representative of $f(\phi\theta)_0$ is evaluated by means such as described with reference to Figure 2 of the aforesaid co-pending patent application. The components in the accompanying Figure 2 denoted by reference numerals not exceeding 75 correspond to the components bearing the same reference numerals in Figure 2 of the co-pending application. Moreover, the components numbered 34 . . . 48 in the drawing of the co-pending application are shown in Figure 2 merely in block form, being denoted by the reference 76, and the parts numbered 49 . . . 55 and 57 . . . 63 are similarly shown in block form and denoted by the reference numeral 77. However, for completeness of illustration, all relevant parts of Figure 2 of co-pending patent application Serial No. 110,404, now forfeited, are illustrated in Figure 6 and, referring to Figures 2 and 6 hereof, the function evaluating part of Figure 2 will first be described. This part consists of a reference source of alternating current 31 which energizes a winding 20 having ten equally spaced taps 21 to 30 thereon. The lower end of the winding 20 is earthed (Figure 6) and the winding provides the major contribution to a plurality of electromotive forces each of which represents a particular value of the function $f(\phi\theta)$, a voltage which represents to ±5 percent, any desired value of $f(\phi\theta)$ being obtainable between one or other of the taps 21 to 30 and earth. A plurality of conductors $a_1$ . . . $a_r$, to each of which is assigned a particular value of $\theta$, are each connected at one end to one of the taps on the winding 20 and these conductors are connected respectively at their other ends to a series of switch contacts $b_1$ . . . $b_r$. At their left-hand ends, the conductors are connected to the tap on the winding 20 which most nearly represents the particular value of $f(\phi\theta)$ at the value of $\theta$ appropriate to the conductor, $\phi$ being a constant in the present case. The number of conductors may be quite large, say of the order of one or two hundred and more than one conductor will in general be connected to each of the taps 21 to 30 on the winding 20. A contact brush 32 of the make-before-break type is driven by the servo-motor 103 through the transmission means 105 to engage selectively the contacts $b_1$ . . . $b_r$ and it is connected through a load impedance 33 to ground. The brush 32 therefore corresponds to the selector member 106 of Figure 1. The contacts $b_1$ . . . $b_r$, although shown for convenience in a straight line, are preferably disposed in a circle in which case the brush 32 is carried on a rotary arm. Since the brush 32 is driven by the servo-motor 103, the position of the brush 32 at any instant is representative of the instantaneous value $(\theta)_0$ of $\theta$ and, as will hereinafter appear, there is set up across the impedance 33 a voltage which at any position of the brush is the value of $f(\phi\theta)$ at the corresponding value of $\theta$.

From the tap on the winding 20 at which it originates, each conductor $a_1$ . . . $a_r$ passes to a first series of seven cores 34 . . . 40 which are toroidal cores although for convenience they are shown as extended cores. The first core 34 is excited by a winding 41 connected across the voltage supply source 31 and each succeeding core 35 to 40 is excited by means of windings 42 to 48 respectively with one third of the flux which the preceding core is excited, as described in detail in our co-pending patent application. Each of the conductors $a_1$ to $a_r$ is laced in positive or negative sense once through a selection of the cores 34 to 40 and passes outside the remainder of the cores in such a way that the E.M.F. set up between each contact $b_1$ . . . $b_r$ and earth due to the winding 20 and the windings 41 to 48 represents the appropriate particular value of $f(\phi\theta)$ evaluated to the accuracy possible by the use of the winding 20 and the cores 34 to 40. As explained in our co-pending patent application, an accuracy of four significant decimal digits is obtainable. It is convenient to regard the conductors $a_1$ . . . $a_r$ as storing different values of $f(\phi\theta)$ for the discrete values of $\theta$ assigned to the respective conductors, the conductor $a_1$ storing a value of $f(\phi\theta)$ for $\theta=\theta_1$, the conductor $a_n$ storing the value of $f(\phi\theta)$ for $\theta=\theta_n$ and so on. The interval between the particular values of $\theta$ assigned to the conductors $a_1$ . . . $a_n$ is constant and equal to $\Delta\theta$. From the cores 34 . . . 40 the conductors $a_1$ . . . $a_n$ pass either to a series of seven cores 49 . . . 55 or to a series of seven similar cores which are represented by the block 56. The cores 49 . . . 55 are provided with windings 57 . . . 63 similar to windings 41 . . . 48 except that the first of the windings is energized by the voltage set up on a contact brush 65 of an autotransformer 64, as will hereinafter appear. The odd-numbered conductors $a_1$, $a_3$ . . . etc. are laced through or past the cores in the series 49 . . . 55 in such a way that if a voltage is applied across the winding 57, that is the winding of highest power in the windings 57 . . . 63, there is added to the value of $f(\phi\theta)$ stored by each of the odd-numbered conductors the value of $\phi f'(\phi\theta)$ at the particular value of $\theta$ assigned to the conductor multiplied by a coefficient $k_1$ which is linearly dependent upon the amplitude of the voltage applied to the winding 57. The odd-numbered conductors pass the series of cores 56 without any magnetic coupling thereto. The even numbered conductors $a_2$, $a_4$ . . . etc. pass the cores 49 . . . 55 without any magnetic coupling therewith, but are laced through or past the cores of the series 56 so as to store in the even-numbered conductors, values of $\phi f'(\phi\theta)$ for the corresponding particular values of $\theta$, multiplied by a coefficient $k_2$ which is linearly dependent upon the voltage applied to the highest power winding of the series 56. As aforesaid, the voltage applied to the winding 57 is derived from a variable autotransformer 64, the winding 57 being connected between earth and a contact brush 65 movable to engage successively a plurality of fixed contacts on the transformer 64. The voltage applied to the highest order winding of the series 56 is also derived from the autotransformer 64, being that set up between earth and another contact brush 66. The autotransformer 64 is connected across a secondary winding 67 magnetically coupled to the winding 20 and, merely for the purpose of describing the operation of the parts of Figures 2 and 6 which are concerned only with the evaluation of $f(\phi\theta)$, it will be assumed that the winding 67 is earthed at its midpoint. The fixed contacts of the autotransformer are arranged in an arc of angular extent slightly exceeding 180° and the brushes 65 and 66 are provided on the opposite ends of a diametric arm 68. The arm 68 is driven with the brush 32 as indicated by the dotted line 69 and the arrangement is such that the arm 68 completes one half counter clockwise revolution when the brush 32 is moved the distance between centres of two adjacent contacts $b_1 \ldots b_r$. The brush 65 is at the midpoint of the autotransformer 64 (which is earthed) when the brush 32 is at the midpoint of an odd-numbered contact $b_1, b_3 \ldots$ etc., and similarly the brush 66 is at the midpoint of the autotransformer when the contact 32 is at the midpoint of an even-numbered contact $b_2, b_4 \ldots$ etc. In the drawing, the brush 32 is shown engaging the contact $b_n$ ($n$ being assumed to be an odd number) and, as the brush 32 moves through the range of positions in which it remains in engagement with the contact $b_n$, the rotation of the arm 68 causes the brush 65 to feed to the winding 57 a variable voltage which is arranged to be such that the aforesaid coefficient $k_1$ varies progressively from a minimum value $-\Delta\theta/2$ through zero to a maximum value $+\Delta\theta/2$. If the brush 32 is now moved into engagement with the contact $b_{n+1}$, at the instant when it is in engagement with both the contacts $b_n$ and $b_{n+1}$ the brushes 65 and 66 are in engagement with contacts at opposite ends of the autotransformer 64, so that at the instant when the coefficient $k$ is caused to be equal to $\Delta\theta/2$, the aforesaid coefficient $k_2$ is caused to be equal to $-\Delta\theta/2$. The brush 65 then moves out of engagement with the fixed contacts of the autotransformer 64 as the brush 32 moves out of engagement with the contact $b_n$ and, as the contact 32 moves through the range of positions in which it remains in contact with $b_{n+1}$, the movement of the brush 65 causes $k_2$ to vary in the interval $-\Delta\theta/2$, $+\Delta\theta/2$. Since the second term of the Taylor expansion for a given function is less important than the first term, the group of cores 49 . . . 55 and the group of cores 56 are such as to give an accuracy to three significant decimal digits in the values of $\phi f'(\phi\theta)$.

From the cores 49 . . . 55, the odd numbered conductors $a_1, a_3 \ldots$ etc. pass to a further series of toroidal cores indicated collectively by the numeral 70. The series of cores 70 add to the electromotive forces induced by each odd-numbered conductor, an electromotive force representing a coefficient $m_1$ multiplied by $$\frac{\phi^2}{2}f''(\phi\theta)$$

at the particular value of $\theta$ appropriate to the conductor. The winding of highest power for the cores of the series 70 has an exciting voltage applied from the movable contact brush 71 of an autotransformer 72 similar to the transformer 64. The brush 71 is driven by the transmission 69 in synchronism with the brush 65 and the transformer 72 is excited by the voltage set up between the brush 65 and earth. The arrangement is thus such that $m_1$ is equal to $(k_1)^2$. The even-numbered conductors from the series of cores 56 pass to a series of toroidal cores 73 the winding of highest power for which is excited by the voltage set up between earth and the contact brush 74 of a further autotransformer 75 similar to 64. The brush 74 is driven by the transmission 69 in synchronism with the brush 66 and the transformer 75 is excited by the voltages set up between the brush 66 and earth. The cores 73 are arranged to add to the electromotive force induced in each even-numbered conductor a voltage representing $$(k_2)^2f''(\phi\theta)/2$$

Each of the series 70 and 73 may consist of four cores, since the importance of the third term of the Taylor expansion is small compared with the second term.

It will now be apparent that when the brush 32 engages the contact $b_n$, say, the voltage set up across the load 33 equals $$f(\phi\theta)_n+\phi k_1 f'(\phi\theta)_n+\frac{\phi^2}{2}(k_1)^2f''(\phi\theta)_n$$

subject to the assumption that the midpoint of the winding 67 is earthed. Moreover, as the brush moves through the range of positions in which it remains in engagement with $b_n$, the coefficient $k_1$ varies through the range from $-\Delta\theta/2$ to $+\Delta\theta/2$, and therefore the voltage set up across the load 33 varies from $f(\phi\theta_n-\phi\Delta\theta/2)$ to $f(\phi\theta_n+\phi\Delta\theta/2)$, to the approximation obtainable by taking only the first three terms of Taylor's expansion. Likewise, when the brush 32 moves through the range of positions in which it remains in engagement with the contact $b_{n+1}$, the value of the voltage set up across the load 33 varies from $f(\phi\theta_{n+1}-\phi\Delta\theta/2)$ to $f(\phi\theta_{n+1}+\phi\Delta\theta/2)$ as $k_2$ varies from $-\Delta\theta/2$ to $+\Delta\theta/2$. When the brush 32 simultaneously engages both contacts $b_n$ and $b_{n+1}$, the voltage across the load 33 is the mean of two nominally equal voltages. From the foregoing, it follows that as the brush 32 moves progressively from the contact $b_1$ to the contact $b_r$ the voltage across the load 33 varies progressively through the values which $f(\phi\theta)$ may take as $\phi\theta$ varies as represented by the movement of the brush 32.

Other components shown in Figure 2 correspond to, and bear the same reference numerals as, components in Figure 1 of the drawing.

The difference voltage E$x$ from the device 101, before amplification by the amplifier 102, is amplified in a negative feedback amplifier having a forward path denoted by 115 and a feedback path denoted by 116. The transfer function or gain of the feedback path 116 is arranged to be $\phi$, i.e.

$$\frac{\delta\varphi\theta}{\delta\theta}$$

so that the output of the amplifier 115, 116 is a voltage representative of $Ex/\phi$. This voltage, in addition to being fed to the amplifier 102 and thence to the servomotor 103, is applied to the centre tap of the secondary winding 67, so that the centre tap is not in fact earthed in this case. The co-efficient of the product formed by 77 and the auto-transformer 64 when the brush 65 is in engagement therewith is therefore $k_1+Ex/\phi$, and similarly the co-efficient of the product formed by 56 and 64 when the brush 66 is in engagement with the latter is $k_2+Ex/\phi$, where the symbol $k_1$ or $k_2$ has the significance already indicated. Consequently, the co-efficient $m_1$ of the product formed by 56 and the autotransformer 71, 72 is $k_1(k^1+Ex/\phi)$ while the coefficient $m_2$ of the product formed by 70 and 74, 75 is $k_2(k_2+Ex/\phi)$. Therefore, when the brush 32 is in engagement with contact $b_n$, the voltage set up across the impedance 33 is given by the following equation:

$$y=f(\phi\theta)_n+(k_1+Ex/\phi)\phi f'(\phi\theta)_n+k_1(k_1+Ex/\phi)\phi^2 f''(\phi\theta)_n/2 \quad (1)$$
$$=f(\phi\theta)_n+k_1\phi f'(\phi\theta)_n+k_1^2\phi^2 f''(\phi\theta)_n/2+Exf'(\phi\theta)_n+k_1Ex\phi f''(\phi\theta)_n/2$$

The first three terms in the right-hand side of this latter equation represent the evaluation of $f(\phi\theta)_o$ as above described on the assumption that the midpoint of the winding 67 is earthed. Moreover, the remaining terms $$Exf'(\phi\theta)_n+k_1Ex\phi f''(\phi\theta)_n/2=Exf'(\phi\theta_n+\phi\Delta\theta)$$

to a close approximation since $k_1=\Delta\theta$. It will be appreciated that these remaining terms arise from the fact that the midpoint of the winding 67 is not earthed. Therefore $$y=f(\phi\theta_n+\phi\Delta\theta)+Exf'(\phi\theta_n+\phi\Delta\theta)$$
$$=f(\phi\theta)_o+Exf'(\phi\theta)_o$$

This is the output $y$ of Figure 1 and is equal to $f(x)_o$.

As the brush 32 moves through the range of positions in which it remains in engagement with the contact $b_n$, $y$ varies therefore progressively from $f(x_n-\Delta x/2)$ to $f(x_n+\Delta x/2)$ even if $Ex$ is not zero, and similarly with all the other contacts $b_o \ldots b_r$.

A more accurate value for the product $Exf'(\phi\theta_n+\phi\Delta\theta)$ would be obtained by doubling $Ex/\phi$ in the third term in the right hand side of Equation 1, making the term read $$k_1(k_1+2Ex/\phi^2 f''(\phi\theta)_n/2$$

This could be achieved for example by doubling the voltage applied to the mid-point of 67, and subtracting a voltage representative of $Ex/\phi$ from the lead from the brush 65, and similarly from the brush 66.

In order that the transmission means 105 may set up the voltage representative of the displacement $\phi\theta$ as indicated in Figure 1 an auto-transformer 117 is connected across the voltage source 31. The auto-transformer 117 has equi-spaced tappings along its length connected by conductors $c_1 \ldots c_r$ to a series of contacts $d_1 \ldots d_r$, there being the same number of contacts $d$ as there are contacts $b$. The contacts $d_1 \ldots d_r$ are arranged in two series one comprising the odd-numbered contacts $d_1$, $d_3 \ldots$ etc. and the other comprising the even-numbered contacts $d_2$, $d_4 \ldots$ etc. A contact brush 118 is adapted to scan the series of contacts $d_1$, $d_3 \ldots$ while a contact brush 119 is adapted to scan the series $d_2$, $d_4 \ldots$. The brushes 118 and 119 are mechanically interconnected but electrically insulated and are arranged to be driven in synchronism with the brush 32 by the transmission means 105, the contacts $d_1 \ldots d_r$ and the brushes 118 and 119 being such that in the range of positions in which the brush 32 engages any one of the contacts $b_1 \ldots b_r$ one or other of the brushes 118, 119 engages the corresponding one of the contacts $d_1 \ldots d_r$. Moreover before the brush 118 say, moves out of engagement with an odd-numbered contact the brush 119 moves into engagement with the succeeding even-numbered contact. The brush 118 is electrically connected to one brush 120 of an auto-transformer 121 while the brush 119 is electrically connected to a second brush 122 of the aforesaid transformer 121. The transformer 121 is arranged to be similar to the transformer 64 and the brushes 131, 122 are arranged to be similar to the brushes 65, 66 and are driven in synchronism therewith. The transformer 121 is energised by means of a secondary winding 123 coupled to the winding 117, the centre tap of the transformer 121 being connected to the aforesaid device 101. As the brush 118, say, moves through the range of positions in which it remains in engagement with, say, the contact $d_n$ a voltage representative of $\phi\theta_n$ plus an increment determined by the brush 120 is fed to a device 101. Moreover, due to the rotation of the brush 120, said increment is caused to vary progressively in the interval from $-\phi\Delta\theta/2$ to $+\phi\Delta\theta/2$. It will therefore be appreciated that as the brushes 118, 119 engage the contacts $b_1 \ldots b_r$ successively the voltage fed to the device 101 is representative of $(\phi\theta)_o$.

The amplifier 115, 116 provides a low impedance source for feeding the mid-point of the secondary winding 67 while the amplifier 102 serves to remove the load of the servo-mechanism from said low impedance source.

In the modification shown in Figure 3, the winding 20 and the series of cores 77 and 56 are utilised in synthesising the voltage representative of the displacement of the brush 32. Each of the conductors $c_1 \ldots c_r$ is connected to a tapping on the winding 20 so as to induce in that conductor an electromotive force representative of $\phi\theta$. The odd-numbered conductors $c_1$, $c_3 \ldots$ etc. are laced through the series of cores 77 in such a way that an electromotive force can be induced in each conductor proportional to the value of $\phi$. The even-numbered conductors $c_2$, $c_4 \ldots$ etc. are similarly laced through the series of cores 56 so that an electromotive force proportional to $\phi$ can be induced in each. The contacts $d_1 \ldots d_r$ are scanned by a brush 123 moved by the transmission means 105 in synchronism with the brush 32, the voltage set up at the brush 123 being fed directly to the device 101 for comparison with $x$. The resultant signal is denoted in the present example by $ex$ and is amplified by a high gain amplifier 124 whose forward path has a gain $\mu$. The amplifier also has a feedback path from its output circuit via the point 67 to the brush 65 (or 66) and thence through the inductive coupling provided by the cores 77 (or 56) to the brush 123. The other parts in Figure 3 correspond to the parts denoted by the same reference numerals in Figure 2. The coefficient set up at the brush 65 and applied to the series of cores 77 is thus $(k_1+\mu ex)$ while that set up at the brush 66 and applied to the series of cores 56 is $(k_2+\mu ex)$. Therefore, if at a given instant the brush 123 engages the contact $d_n$ the voltage fed from 123 to the device 101 has the value $$\phi\theta_n+(k_1+\mu ex)\phi=(\phi\theta_n+\phi k_1)+\phi\mu ex$$

The sum $(\phi\theta_n+\phi k_1)$ represents $(\phi\theta)_o$ and $\phi\mu ex$ is effectively the difference between $x_o$ and $(\phi\theta)_o$ $ex$ being very small because of the high gain of the amplifier 124. The quantity $\phi\mu ex$ is therefore equivalent to the quantity Ex of Figure 2, and it will be appreciated that it comprises a signal derived from the amplifier 124 and added to the signal representative of the instantaneous value $\phi\theta$ before the comparison is effected with the input signal. The signal which is applied to the amplifier 102, and also to the mid-point of 67 is representative of $Ex/\phi$, which in the present example is $$Ex/\left\{\frac{\partial\phi\theta}{\partial\theta}\right\}_o$$

The transfer of the feedback path of the amplifier 124 is therefore $\phi$, the same as that of the amplifier 115 in Figure 2. The voltage set up across the resistance 33 when the brush 32 engages, say, the contact $b_n$ can therefore be represented by Equation 1, so that in general it can be said that $$y=f(\phi\theta)_o+Exf'(\phi\theta)_o$$

Therefore $$y=f(\phi\theta_o+Ex), \text{ approximately}$$
$$=f(x_o-ex)$$

Provided that $\mu\phi$ is large, that is provided that $Ex$ is large compared with $ex$ the output $y$ is representative of $f(x)_o$ without significant error.

In addition to the simplification achieved by utilising the winding 20 and the series of cores 77 and 56 to synthesise $(\phi\theta)_o$, the apparatus illustrated in Figure 3 has the important advantage that errors in the output which are liable to arise due to the "granularity" of the autotransformer 64, i.e. due to the finite difference between the voltages set up at the contacts of the auto-transformer, are automatically compensated since the same errors arise in the synthesis of $(\phi\theta)_0$ and are therefore accounted for in the difference quantity *Ex*. It is therefore possible for the transformer 64 to have relatively widely spaced contacts, the limit being set in practice by the accuracy required from the transformers 72 and 75 which should have the same granularity as the transformer 64.

The use of a transformer 64 having widely spaced contacts leads, however, to a disadvantage. Due to practical limitations it is impossible to ensure that the two slow speed brushes 32 and 123 change from one contact to another at the same instant. This can give rise to the condition in which one brush, say 32, is on an even-numbered contact, while the other brush 123 is on an odd-numbered contact. The difference voltage $\mu ex$ then compensates for the granularity error in the voltage taken from the brush 65 whereas the granularity error in the output $y$ is that due to the brush 66. Figure 4 illustrates a modification of Figure 3 which has the object of avoiding this disadvantage. The auto-transformer 64 is replaced by a transformer having a primary winding 125 connected across the winding 67, and having two identical secondary windings 126 and 127. Equispaced points on the winding 126 are connected to contact studs 128, while equispaced points on the winding 127 are connected to contact studs 129, the studs 128 and 129 being arranged in a circle as shown. The end points of the winding 126 are connected to arcuate diametrically opposite contacts 130 and 131, and the end points of the winding 127 are similarly connected to arcuate contacts 132 and 133 arranged in relation to the contacts 130 and 131 as indicated. The rotary arm 68 in this case carries only a single contact brush 133 adapted to engage contacts 128 and 129 and the amplified difference voltage $\mu ex$ is applied to the brush 133. The arm 68 carries a further contact 134, which, through a range of angular positions of the arm 68, is adapted to bridge the contacts 130 and 132, and through another range of positions is adapted to bridge the contacts 131 and 133. The windings 126 and 127 are arranged to be excited so that the voltages at the upper and lower ends of 126 at any instant are in the same phase as those at the lower and upper ends of 127, respectively. Moreover, the arcuate contacts 130 and 132 are arranged to subtend an angle at the centre of 68 such that the adjacent ends of 126 and 127 are electrically interconnected by 134 throughout the range of angular positions of 68 in which there is any uncertainty as to the positions of the brushes 32 and 123 on changing from an odd-numbered contact to an even-numbered contact. Similarly the arcuate contacts 131 and 133 subtend an angle covering the range of uncertainty of the brushes 32 and 123 on changing from an even-numbered contact to an odd-numbered contact. The voltage representative of the co-efficient applied to the series of cores 77 is taken from the mid-point of 127 while that representative of the co-efficient applied to the series of cores 56 is taken from the mid-point of 126. The foregoing arrangement ensures that the voltage fed to the two series of cores 77 and 56 is identical during any period of uncertainty as to the position of the brushes 32 and 123.

The apparatus shown in Figure 3 can also be readily extended to the case where $\phi\theta$ is not a linear function of $\theta$ but is an arbitrary non-linear function, denoted say by $f_1(\theta)$. By lacing the conductors $c_1 \ldots c_r$ through the series of cores 76, 77, 56, 70 and 73 in the same manner as the conductors $a_1 \ldots a_r$ it can be arranged that the conductors $c_1 \ldots c_r$ are such that voltages can be induced in them which have the successive particular values of $f_1(\theta)$, $f_1'(\theta)$ and $f_1''(\theta)/2$ as factors. The voltage fed by the negative feedback path 109 to the device 101 at any instant is then representative of $$f_1(\theta)+\mu exf_1'(\theta)=x-ex$$

Let the voltage $y$ represent $$f_2(\theta)+\mu exf_2'(\theta)$$

Treat $f_2(\theta)$ as a function of $f_1(\theta)$, so that $$f_2(\theta)=f_0[f_1(\theta)] \text{ and } f_2'(\theta)=f_1'(\theta)f_0'[f_1(\theta)]$$

Then $$\begin{aligned} y&=f_0[f_1(\theta)]+\mu exf_1'(\theta)f_0'[f_1(\theta)] \\ &=f_0[f_1(\theta)+\mu exf_1'(\theta)] \text{ approximately} \\ &=f_0[x-ex] \end{aligned}$$

If $\mu$ is sufficiently high it can then be said that $$y=f(x)$$

It will thus be appreciated that the arrangement shown in Figure 2 is only a particular example of the generalised case, since $\phi$ is the first derivative of $\phi\theta$ while the second derivative thereof is zero. In a limiting case $f_1(\theta)$ may be equal to $\theta$.

The above described principle can also be applied to apparatus adapted to evaluate simultaneously, in dependence upon the displacement $\theta$, a plurality of different functions of $x$. It is then merely necessary to feed the same correcting signal to all the cores which serve to store the first derivatives of the functions. The principle is also applicable to apparatus for evaluating functions of two or more variables. In the special case where the function to be evaluated can be represented as $y=af(x)$ apparatus such as illustrated in Figure 2 can be employed, by feeding the winding 20 with a voltage representative of $a$ instead of from a source of fixed reference voltage and by introducing a multiplier between the amplifier 102 and the transformer 67 (or the brush 68 in the case of the modification of Figure 4), the multiplier being adapted to convert $Ex/\phi$ to $aEx/\phi$. The multiplier employed need not have a high degree of accuracy. The case of an arbitrary function of two variables is more complicated but can in practice be reduced to separate one dimensional systems.

Figure 5 illustrates an application of the present invention to remote control apparatus for transmitting to a distance signals for performing an operation in dependence on a voltage, representative of an independent variable $x$. The voltage $x$ is applied to the input terminal 135 and the apparatus employs a servo-motor which is indicated in block form at 136. The shaft 137 of the servo-motor, whose displacements can be represented at any instant by $\theta$, carries an exciting winding 138 whose magnetic axis is perpendicular to the axis of the shaft, a fixed alternating reference voltage being fed to the winding 138 from a source 139. The shaft 137 also operates a contact 140 so that as the shaft rotates it scans an auto-transformer 141 to which is fed a suitable reference voltage which may be obtained from the source 139. The voltage set up at the contact 140 at any instant is therefore representative of the instantaneous value of $\theta$ and this voltage is applied as negative feedback to the device 142 of an amplifier 143 whose input signal is the input voltage $x$. The output of the amplifier 143 is applied to the servo-motor 136 so that in known manner the servo-motor tends to maintain said difference equal to zero. Although, for convenience of illustration, a simple auto-transformer device is shown for synthesising the feedback voltage representative of $\theta$, in practice it may be necessary to utilise mechanism such as indicated by the references 117 to 123 in Figure 2 to obtain the necessary accuracy.

The exciting winding 138 is magnetically coupled to three secondary windings 144, 145 and 146 whose magnetic axes are disposed in a plane which is normal to the axis of the shaft 137. The windings 144 . . . 146 are equiangularly disposed about the axis of the shaft 137 and voltages are therefore set up across the windings 144 . . . 146 whose relative magnitudes are dependent upon the angular displacement of the exciting winding 138 and hence on the instantaneous value of $\theta$. The shaft 137 carries in addition to the winding 138 an auxiliary winding 147 having its magnetic axis perpendicular to the axis of the shaft 137 and to the magnetic axis of the winding 138. The winding 147 is excited by the output of the amplifier 143 so that the resultant flux which excites the secondary windings 144, 145 and 146 is the vector sum of the fluxes set up by the windings 138 and 147. By a suitable predetermination of the number of turns in the winding 147, it is arranged that if at any instant the value of $\theta$ fed back to 142 from the contact 140 is not equal to voltage $x$ the flux set up by the winding 147 rotates the resultant flux vector from the axis of 138 through an angle which represents the discrepancy between $\theta$ and $x$. The resultant voltages set up across the secondary windings 144, 145 and 146 are therefore capable of accurately performing an operation in dependence on the voltage $x$ irrespective of the errors in the servo-mechanism 136, provided of course said errors are not too large. The aforesaid voltages can be obtained from the output terminals 148, 149 and 150, and together they constitute a signal indicative of the instantaneous value of $x$.

What we claim is:

1. Apparatus for deriving an output signal variable in response to an input signal, comprising a servo-motor, follower means displaceable in response to the servo-motor for setting up a function signal, means for setting up a signal representative of the displacement of said follower means, means for comparing the last-mentioned signal with the input signal, said servo-motor being responsive to the difference between the compared signals to displace said follower means in a sense tending to reduce said difference, means for forming the product of the difference between the compared signals and a signal dependent upon the function signal to generate a correcting signal, and means for adding said correcting signal to said function signal to correct said function signal for differences between said displacement and said input signal.

2. Apparatus responsive to an input signal for evaluating a function of said signal, comprising a servo-motor, a selector displaceable by the servo-motor, means responsive to the selector for setting up the value of said function corresponding to the displacement of the selector, means for setting up a signal representative of the displacement of the selector, means for comparing said last-mentioned signal with the input signal, said servo-motor being responsive to the difference between the compared signals to displace said follower means in a sense tending to reduce said difference, means for forming at least approximately the product of the difference between the compared signals and the instantaneous value of the first derivative of said function with respect to said displacement, and means for adding said product to said value of the function to set up an output signal corrected for said difference between said displacement and said input signal.

3. Apparatus responsive to an input signal for evaluating a function of said signal, comprising a servo-motor, a function evaluating means responsive to the servo-motor for setting up signals representing the instantaneous value of first and second functions of the displacement effected by the servo-motor, said servo-motor being responsive to the input signal to tend to maintain the signal representing said first function equal to said input signal, means for deriving a difference signal representing the difference between the signal representing said first function and said input signal, means for deriving a correcting signal representing at least approximately the product of said difference signal and the instantaneous value of the first derivative of said second function with respect to said first function, and means for forming an output signal comprising the sum of said correcting signal and the signal representing said second function, whereby said output signal represents approximately the instantaneous value of the same function of the input signal as the second function of said first function.

4. Apparatus according to claim 3, said function evaluating means including a selector member linearly responsive to the displacement effected by the servo-motor, said first function being the displacement of said selector means.

5. Apparatus according to claim 3, said means for deriving the difference signal comprising an amplifier, means for adding a signal dependent on the output of said amplifier to a signal representing said first function and for comparing the resultant with said input signal, the amplifier being arranged to amplify the difference of said compared signals and the servo-motor being responsive to the output of said amplifier, whereby said signal depending on the output of said amplifier constitutes said difference signal.

6. Apparatus according to claim 3, said function evaluating means including means for storing values of said second function for successive particular values of said first function, means for storing values of the first derivative of said second function for said particular values of said first function, means for deriving the increment between the instantaneous value of said first function and the nearest of said particular values, and means for multiplying said increment by the value of the first derivative of the first function for said nearest particular value and for adding the product to the value of said second function for said nearest particular value to set up the instantaneous value of said second function, said means for deriving said correcting signal including means for adding said difference signal to said increment, whereby said difference signal is also multiplied by the first derivative of said second function for the nearest particular value of the first function.

7. Remote control apparatus comprising a winding having a magnetic axis, a servo motor for rotating said winding about an axis of rotation at right angles to the magnetic axis of said winding, means for energising said winding with a reference voltage, an auxiliary winding mounted for rotation with said first winding, said auxiliary winding having a magnetic axis at right angles to said axis of rotation and inclined to the magnetic axis of said first winding, means for generating a voltage representative of the angular displacement of said windings about said axis of rotation, means for comparing said generated voltage with an input voltage to derive a difference voltage, said servo motor being responsive to said difference voltage to cause rotation of said windings in a sense tending to reduce said difference voltage, means for energising said auxiliary winding with a voltage depending upon said difference voltage so that said windings jointly set up a flux having a direction whose angular displacement about said axis of rotation is representative of the magnitude of the input signal before said difference voltage is zero, and means for deriving electrical signals representative of the angular displacement of said flux.

8. Apparatus according to claim 7, said windings having their magnetic axes mutually at right angles.

9. Apparatus responsive to an input signal for evaluating a function of said signal comprising a servo motor arranged to effect a displacement, means responsive to the servo motor for generating a first signal representative of the value of a first function of said displacement, means responsive to the servo motor for generating a second signal representative of the value of a second function of said displacement, an amplifier, means for forming the product of the output signal from the amplifier and the first derivative with respect to said displacement of said first generated signal, means for adding said product to said first generated signal, means for subtracting the resultant sum from said input signal to produce a difference signal, means for feeding said difference signal to said amplifier as the input signal thereto, said servomotor being responsive to the output signal from said amplifier to vary said first and second generated signals in a sense tending to reduce said difference signal to zero, means for forming at least approximately the product of said output signal from the amplifier and the first derivative with respect to said displacement of said second generated signal, and means for adding the last mentioned product to said second generated signal to form an output signal, whereby said output signal has the value representing the same function of said input signal as the second generated signal is of the first generated signal.

References Cited in the file of this patent

UNITED STATES PATENTS

| | | |
|---|---|---|
| 1,684,138 | Nixdorf | Sept. 11, 1928 |
| 1,703,280 | Minorsky | Feb. 26, 1929 |
| 1,988,458 | Minorsky | Jan. 22, 1935 |
| 2,415,080 | Bonnell | Feb. 4, 1947 |
| 2,425,317 | Harris | Aug. 12, 1947 |
| 2,537,083 | Peoples | Jan. 9, 1951 |

OTHER REFERENCES

"Stabilization of Wide-Band Direct-Current Amplifiers for Zero and Gain," by Goldberg; RCA Review, June 1950, volume XI, No. 2, pages 296–300.